No. 734,018.

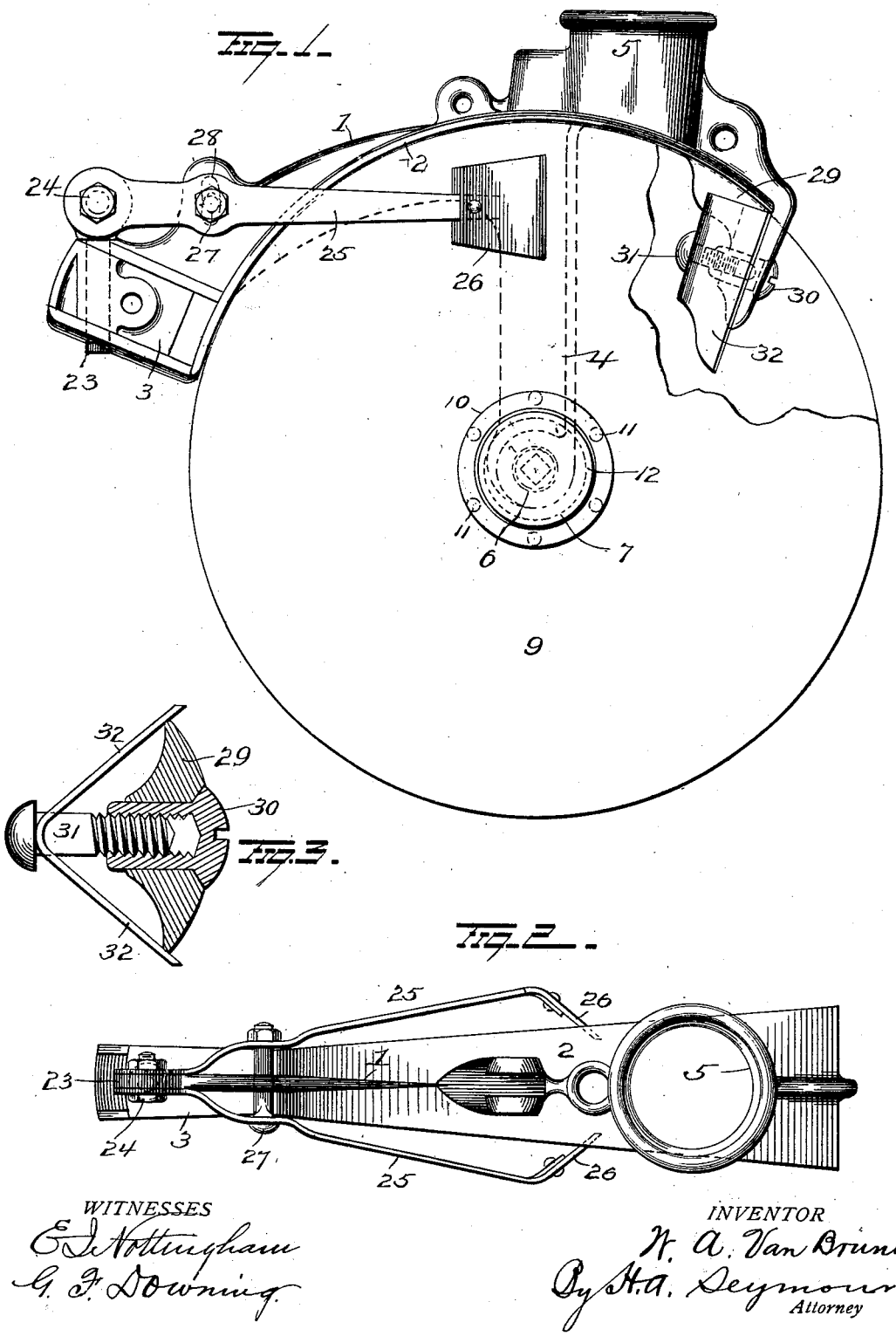

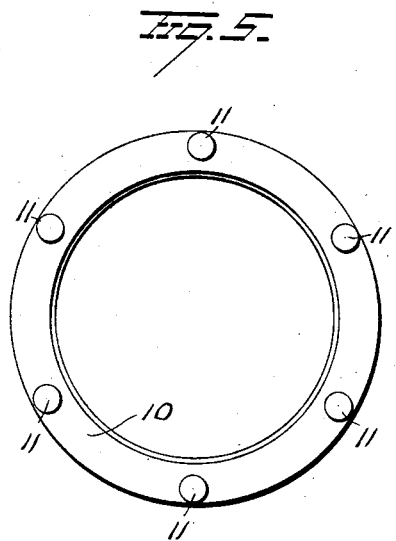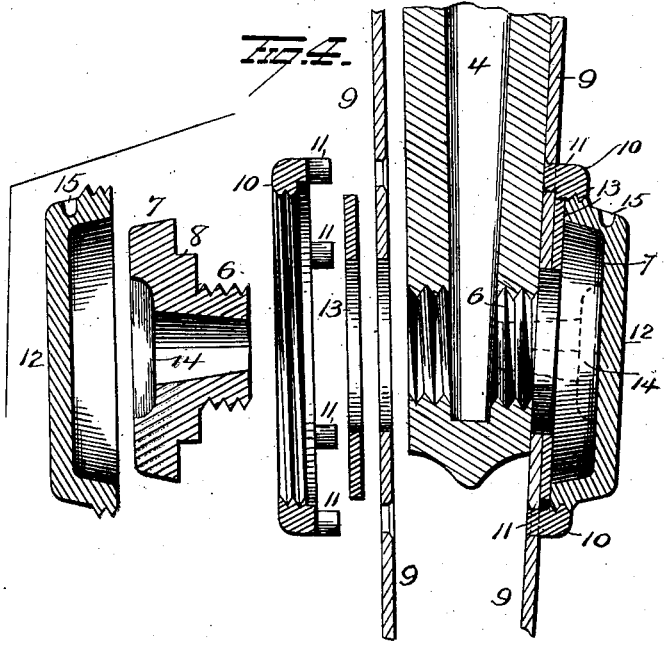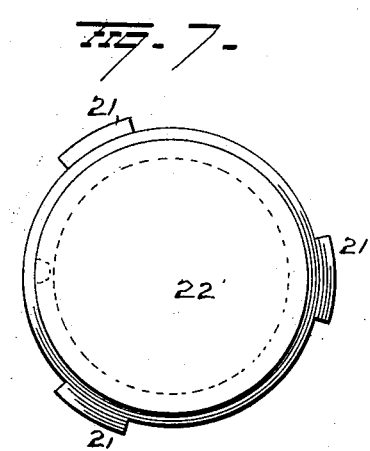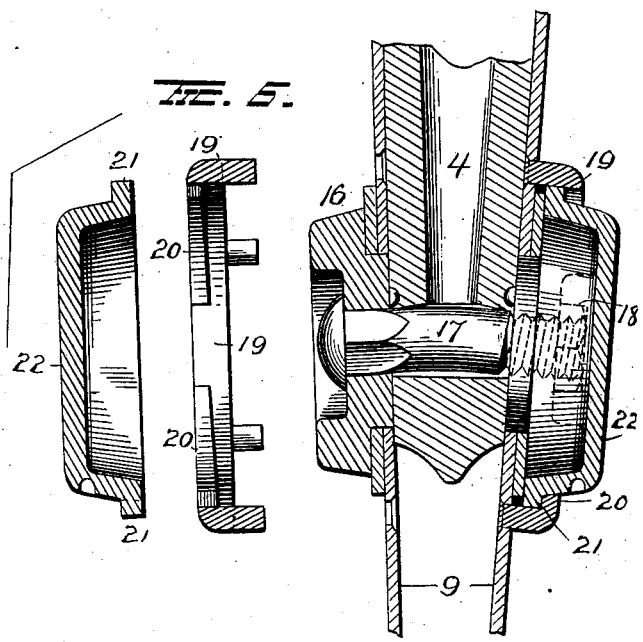

Patented July 21, 1903.

UNITED STATES PATENT OFFICE.

WILLARD A. VAN BRUNT, OF HORICON, WISCONSIN.

DOUBLE-DISK DRILL.

SPECIFICATION forming part of Letters Patent No. 734,018, dated July 21, 1903.

Application filed April 17, 1903. Serial No. 153,139. (No model.)

*To all whom it may concern:*

Be it known that I, WILLARD A. VAN BRUNT, a resident of Horicon, in the county of Dodge and State of Wisconsin, have invented certain new and useful Improvements in Double-Disk Drills; and I do hereby declare the following to be a full, clear, and exact description of the invention, such as will enable others skilled in the art to which it appertains to make and use the same.

My invention relates to improvements in double-disk drills, the object of the invention being to provide improved bearings for the disks and improved scrapers for scraping or cleaning the inner and outer faces of the disks to prevent the accumulation of dirt and trash from interfering with the perfect operation of the drill, and, further, to provide improved bearings for the disks which will permit of ready access to the parts for cleaning them or removing broken or worn parts and their replacement by new parts.

With these objects in view the invention consists in certain novel features of construction and combinations and arrangements of parts, as will be more fully hereinafter described, and pointed out in the claims.

In the accompanying drawings, Figure 1 is a view in side elevation, partly broken away, illustrating my improvements. Fig. 2 is a top plan view. Fig. 3 is a detail view of the inside scraper. Figs. 4 and 5 are views illustrating the disk-bearings, and Figs. 6 and 7 are similar views of a modified form of bearing.

1 represents the disk-frame, which comprises a curved plate 2, having an enlargement or block 3 at its forward end, a vertical hollow lubricant-conducting standard 4 between its ends, and suitable perforated ears for the attachment of the ordinary drag and lifting bars, and a suitable seed-tube 5 is provided for dropping the seed between the disks.

The standard 4 is provided in opposite sides near its lower end with screw-threaded openings communicating with the lubricant-duct therein, and hollow screw-threaded lugs 6 on bearing-blocks 7 are screwed into said openings, the threads of the lugs being, respectively, right and left, so that the rotation of the disks tends to tighten the bearings in place.

The bearing-blocks 7 have contracted journals 8, on which the disks 9 revolve, and my improved bearing-cups are secured to the disks and turn on the blocks, as will now be explained.

The cups each comprise two members, one member 10 being an internally-screw-threaded ring having integral lugs or rivets 11 around its inner edge to enter openings in disk 9 and be upset or securely riveted therein. The other member 12 is saucer-shaped and externally screw-threaded to screw into member or ring 10 and turn on the block.

Washers 13 are preferably placed on blocks 7 between them and the disks to prevent wear of the disks and block, and a lubricant receptacle or pocket 14 is made in each block to receive the lubricant from standard 4 and supply the same to the bearing, and suitable sockets 15 are provided in the removable members 12 to permit the employment of a spanner-wrench to remove or replace them.

In Figs. 6 and 7 I illustrate a modified form of bearing in which the lugs 6 are dispensed with, and alined openings are made in standard 4 for the passage of a headed bolt 17, and bearing-blocks 16 are secured in place by said bolt and a nut 18.

Instead of internally screw-threading the ring 19 I provide the same with internal cam-flanges 20, spaced apart to permit the entrance of lugs or flanges 21 on the removable member or cap 22, so that when the cap 22 is placed in position with its lugs or flanges 21 below cam-flanges 20 and is given a partial turn it will be effectually secured in place. The cam-flanges are so disposed that the turning of the disks tends to tighten the cap in place.

While I have in both forms of bearing illustrated the removable member as being on the bearing-block, it is to be understood that I do not confine myself thereto, as the member fixed to the disks may form the complete bearing and the removable member be merely a closure therefor.

In the block or enlargement 3 at the forward end of the frame 1 an approximately vertical opening is provided to receive a pin 23, having a flat circular perforated head at its upper end to receive a bolt 24, also passed through openings in the forward ends of spring-arms 25, located on opposite sides of pin 23 and secured thereto by an ordinary nut. These spring-arms 25 bow outward around plate 2, which it will be observed projects at both sides beyond the outer face of the disks. The rear ends of arms 25 are bent inward and have plates or scrapers 26 secured thereto and adapted to bear against the outer faces of the disks and effectually clean them.

To regulate the tension of the spring-arms, I connect them between their ends by a bolt 27, also passed through an elongated slot 28 in frame 1 to permit pivotal movement of the arms on bolt 24 to dispose the scrapers against the edges of plate 2 and hold them out of contact with the disks when working in soil in which the scrapers are not needed or for any other reason it may be desired that the scrapers be idle. This pivotal movement of the arms 25 on bolt 24 also enables the scrapers to be moved nearer to or farther from the edge of the disks, and the rotary support of pin 23 in block 3 compels uniform pressure of the scrapers on both disks.

In a depending arm 29 on the rear end of frame 1 a hollow-headed sleeve 30 is located and is internally screw-threaded to receive a headed screw 31, which latter engages a scraper 32, composed of spring sheet metal bent longitudinally and having its end portions engaging the sides of arm 29, so that when the screw or sleeve is adjusted the scraper will be widened or contracted to effectually scrape the inside of the disks.

A great many changes might be made in the general form and arrangement of parts described without departing from my invention, and hence I do not confine myself to the precise details set forth, but consider myself at liberty to make such changes and alterations as fairly fall within the spirit and scope of my invention.

Having fully described my invention, what I claim as new, and desire to secure by Letters Patent, is—

1. In a disk drill, the combination with a support, of a bearing-block removably secured to the support, a disk turning on said block, and a bearing-cup turning on the block and comprising two members, one secured to the disk and the other removably secured to the first-mentioned member to permit the removal of the bearing-block without disconnecting the first-mentioned member from the disk.

2. In a disk drill, the combination with a support, of a disk, of a bearing-block removably secured to the support and disposed between the disk and a bearing-cup, said bearing-cup turning on the block and comprising two members, one secured to the disk and the other removably secured to the first-mentioned member to permit the removal of the bearing-block without disconnecting the first-mentioned member from the disk.

3. In a disk drill, the combination with a support, of a bearing-block removably secured to the support, a disk turning on a journal of said bearing-block, a ring secured to the disk around the block and of greater diameter than the block, and a cap removably secured in the ring and turning on the block.

4. In a disk drill the combination with a support, of a disk, of a bearing-block removably secured to the support and disposed between the disk and a bearing-cup, said bearing-cup turning on the block and comprising two members, one a ring secured to the disk around the block and of greater diameter than the block, the other a cap removably secured to the ring and turning on the block.

5. In a disk drill, the combination with a support having a lubricant-duct therein, of a bearing-block having a hollow lug screwed into an opening in the support and communicating with the lubricant-duct therein, said block having a lubricant-pocket in its outer face supplied with lubricant through the hollow lug, and a bearing-cup turning on the block and comprising two members removably secured together and one of said members secured to the disk.

6. In a disk drill, the combination with a support having a lubricant-duct therein, a disk, of a bearing-block having a hollow lug screwed into an opening in the support and communicating with the lubricant-duct therein, and a bearing-cup turning on the block and comprising two members removably secured together and one of said members secured to the disk.

7. In a disk drill, the combination with a support, of a bearing-block secured thereto and having a contracted journal, a disk mounted to turn on the journal, a washer between the disk and the bearing-block, an internally-screw-threaded ring having lugs thereon to be riveted in holes in the disk, and an externally-screw-threaded cap screwed into the ring and turning on the block.

8. In a disk drill, the combination with a support, of a disk, a bearing-block secured to the support, a washer between the disk and the bearing-block, a bearing-cup turning on the block and comprising two members removably secured together and one of said members secured to the disk.

9. In a disk drill, the combination with a support having a lubricant-duct therein, of bearing-blocks having screw-threaded lugs screwed into openings in opposite sides of the support, and having lubricant-pockets in their outer faces and ducts connecting them with the duct in the support, and bearing-cups secured to the disks inclosing the blocks and having removable sections to permit the removal of the blocks without detachment from the disks.

10. In a disk drill, the combination with a support having a lubricant-duct therein, of disks, of bearing-blocks having screw-threaded lugs screwed into openings on opposite sides of the support, and bearing-cups secured to the disks inclosing the blocks and having removable sections to permit the removal of the block without detachment from the disks.

11. In a disk drill, the combination with a frame, of bearings on the frame, disks turning on said bearings, a pin having rotary mounting in the support, spring-arms pivoted to said pin, scrapers on the arms to bear against the outer faces of the disks, and a tension-bolt connecting the arms between their ends.

12. In a disk drill, the combination with a frame, and disks mounted to turn thereon, of a pin having rotary bearing in the forward portion of the frame, spring-arms pivotally secured at one end to the pin, and bowed between their ends around the frame, scrapers on the rear ends of the arms to bear against the outer faces of the disks, a tension-bolt connecting the spring-arms between their ends and passed through a slot in the frame to permit pivotal movement of the arms on the pin to dispose the scrapers against opposite sides of the frame and out of contact with the disks.

13. In a disk drill, the combination with a support, of disks mounted to turn on the support and disposed at an angle to each other, spring-pressed scrapers for the outside of said disks, means for adjusting the tension of said scrapers, a pivoted mounting for the scrapers common to both of them to equalize the pressure on both disks and scrapers carried by the support for scraping the inside of both disks.

14. In a disk drill, the combination with a support, of disks turning thereon, of a depending arm on the support between the disks, a sheet-metal scraper bent longitudinally and bearing against the arm, an internally-screw-threaded sleeve in an opening in the arm, and a screw in said sleeve passed through the scraper.

15. In a disk drill, the combination with a support, of disks turning on opposite sides thereof, a depending arm on the support between the disks, a scraper for the inside of the disks composed of sheet spring metal bent longitudinally and against the arm, and means for spreading said scraper or permitting the same to contract.

In testimony whereof I have signed this specification in the presence of two subscribing witnesses.

WILLARD A. VAN BRUNT.

Witnesses:
F. H. CLAUSEN,
F. P. BIRD.